Dec. 10, 1957  F. G. BACK ET AL  2,815,701
PANORAMIC CAMERAS

Filed Jan. 19, 1956  4 Sheets-Sheet 1

United States Patent Office 2,815,701
Patented Dec. 10, 1957

2,815,701

PANORAMIC CAMERAS

Frank G. Back, Glen Cove, and Alfred Joseph Quittner, Kew Gardens, N. Y.; said Quittner assignor to said Back Application January 19, 1956, Serial No. 560,173

3 Claims. (Cl. 95—17)

The present invention relates to improvements in the construction, design and performance of cameras, and more particularly such cameras as are commonly referred to in the art as "Panoramic" Cameras.

It is an object of the present invention to provide a new, improved "panoramic camera" which is especially suitable for use in conjunction with tele-photo-objectives.

It is a further object of the present invention to provide, with respect to design, construction and operation, a simple, compact device having the least number of moving parts and being provided with standard film support and transport means for the standard type films.

The foregoing and other objects of the present invention will hereinafter be obvious and apparent with particular reference to the detailed description and to the drawings attached hereto, in which several preferred examples embodying the present invention are set forth in detail.

It is understood, that variations may be made in the designs and constructions here described and shown as preferred exemplifications, without thus circumventing the scope of the present invention which comprises the essential generic and specific features here illustrated and defined within the limits established by the prior art and the scope of the claims herein.

Having now reference to the illustrations of the present invention it will be seen that:

Figure 1:
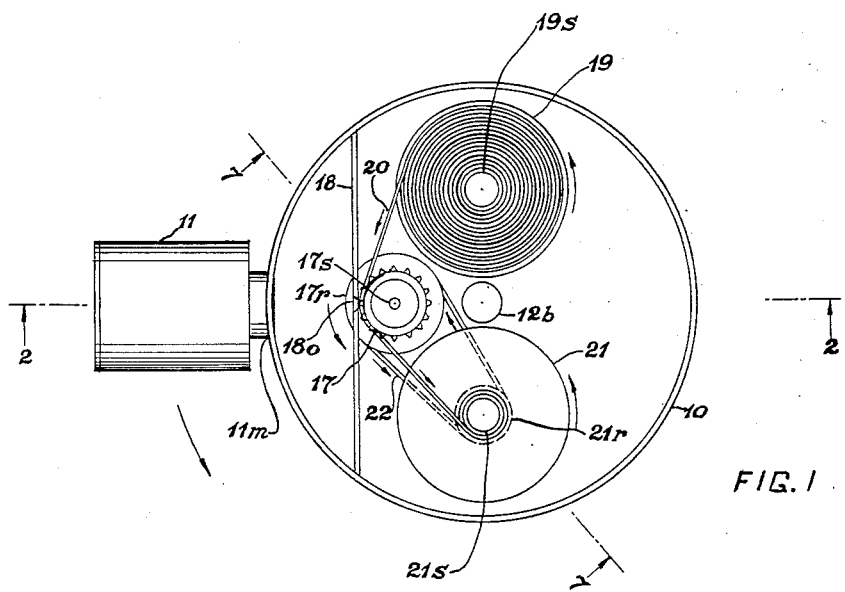
Fig. 1 is a top plan view showing one preferred form of construction for a panoramic camera in accordance with the present invention. The top-cover of the camera housing has been removed in this view.
Figure 2:
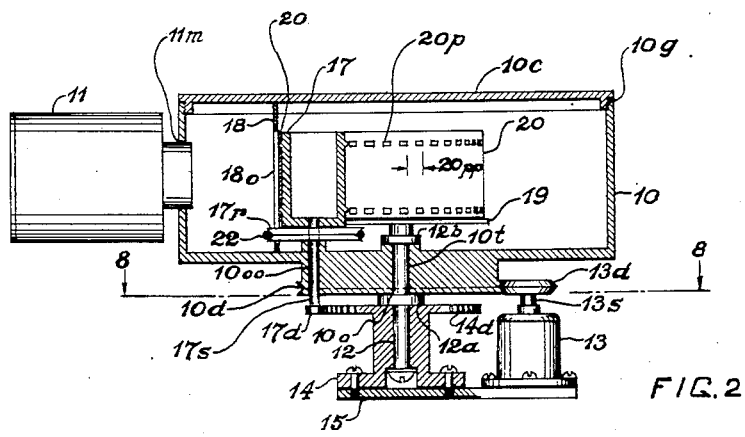
Fig. 2 is a view in side elevation and cross-section along the line 2—2 of Fig. 1.

In the drawings and illustrations (Figs. 1 to 9 incl.) similar reference characters serve to identify all similar and identical parts, portions and details throughout all the several views as respectively shown and illustrated in the said drawings Figs. 1, 2, 3, 4, 5, 6, 7, 8, and 9.

Having now recourse to the illustrations, it will be seen that the panoramic cameras of the present invention consist of a suitable camera-housing 10 provided with removable sections or covers 10c to permit easy access to the mechanisms of the said camera and the film 19 therein.

The spindle 12 is fixedly mounted upon the base-plate 15 by means of the socket 14. The motor 13 is likewise fixedly mounted upon the said base-plate 15. By means of a linkage arrangement consisting of the drive-shaft 13s and the drive-wheel 13d, wherein the said drive-wheel 13d engages the friction-disk 10d, which is a contiguous integral portion of the camera-housing 10, the housing 10 is rotated around said fix spindle 12, which constitutes, as illustrated, the axis of rotation for the camera unit.

In reference to further detail, it will be noted that the aforementioned friction-disc 10d is centrally thereof provided with an annular opening 10o, this extends in the vertical plane to form the substantially tubular opening 10t, which (as particularly shown in Figs. 2, 4 and 6) is coextensive the center of the housing 10 and is adapted to receive within the upper end portion of the spindle shaft 12. Thus the housing 10 is rotatably placed upon the spindle 12. To properly maintain the housing 10 in position for substantially friction-free rotation in the horizontal plane the bearing rings 12a and 12b are mounted upon said spindle 12 at the points where the tubular opening 10t respectively commences and terminates. Thus the relation between the moving and stationary elements, in direct contact, is maintained substantially free of friction the fixed spindle 12 constituting practically the axis of rotation for the housing 10 around which the same rotates continuously or intermittently at variable and controlled speeds for 360°.

Within said camera-housing 10, the sprocket-drum 17 for the purpose of film-transport is rotatably arranged in cooperative combination with the film supply spool 19 and film winding-up-spool 21.

For the purposes of the present invention as will be hereinafter set forth in detail, there must be maintained a specific relationship between the rotations of the camera on the one hand and the film-transport sprocket 17 on the other.

While a preferred type of arrangement for the accomplishment of this concurrent, correlated arrangement of rotation, in which camera-housing 10 and film-transport-sprocket 17 rotate in the same direction but at different speeds, and the speeds respectively have a specific ratio relative to each other, is shown and illustrated here; it is of course understood that the said accomplishment of such correlated rotation with a specific ratio between (a) the rotation of the camera-housing 10 upon the spindle 12 and (b) the rotation of the film-transport-sprocket 17 in the same and like direction, constitutes one of the basic elements of the present invention, without limitation to the mechanical means for the accomplishment thereof, here shown merely for the purposes of adequate exemplification and description. Any mechanical arrangement which encompasses the specific relationship in operating function, herein above and below disclosed, is well within the scope of the present invention.

In the mechanical arrangements illustrated, the rotation of the film-transport-sprocket 17 is actuated by the same motor 13, wihch rotates also concurrently the camera-housing 10. The rotation of the camera-housing 10 on the spindle 12 rotates the shaft 17s, which is integral with the film-transport-sprocket 17, depending therefrom. This shaft 17s terminates in the driving-gear 17d which engages with the stationary fixed gear plate 14d. Now, when the shaft 17s rotates around the axis represented by the spindle 12, during the rotation of said camera-housing 10, the aforesaid engagement between the driving gear 17d and the stationary-gear-plate 14d imparts a rotation to the shaft 17s which is rotating thus the film-transport sprocket 17. The rotation of the camera-housing 10 and the film-transport sprocket 17 is in the same direction for both, the former rotating around the axis represented by the spindle 12 and the latter rotating both, around the axis represented by the spindle 12 and also around the axis represented by the shaft 17s in a manner called in the mechanical arts "a planetary movement."

The above described mechanical arrangement constitutes the mechanical component of the present invention which in cooperation with the optical elements, the objectives 11 hereinafter described in detail, accomplishes the intended ends.

The basic principles underlying the present invention may well be expressed as follows: The length of a strip of film, exposed during one complete rotation of the camera (360°), must equal to the length of the circumference of a circle; and the radius of this circle must correspond to the equivalent focal length of the lens used.

The foregoing principle may be simply expressed by the formula:

*Formula I*

$$L = 2 \times F \times 3.14159 \ldots$$

wherein: L is the length of film exposed during a 360° rotation of the camera; and wherein: F is the equivalent focal length of the objective employed in conjunction with the camera. To mechanically utilize and apply the principle expressed in Formula I, the specific arrangements illustrated in Figs. 1, 2, 3, 4, 5, 6, 7, 8, and 9 have been developed. Thus there is established the requisite mechanical relationship between the rotation of the camera-housing 10 and the rotation of the film-transport-sprocket 17. This relationship is variable and will be exactly determined by two factors: the radius of the film-transport-sprocket 17 (R) and the equivalent focal length (F) of the objective used. This mechanical relationship may again, for simplicities' sake be expressed by a formula:

*Formula II*

$$\frac{F+R}{R} = \frac{N}{n}$$

wherein: F is the equivalent focal length of the objective employed; R is the radius of the film-transport-sprocket; N is the number of revolutions of the film-transport sprocket within a specified time-period; and n is the number of revolutions of the camera-housing within this same, specified time-period.

As evident from Formula II, particularly, it is necessary to maintain a specific ratio between the (n) rotation of the camera-housing 10, and (N) the rotation of the film-transport-sprocket 17. In maintaining this ratio it is further pertinent to have this ratio be equal to the ratio established between the sum of the equivalent focal length of the objective 11 used (F) and the radius (R) of the film-transport-sprocket 17 divided by R the radius of the film-transport-sprocket 17. It is understood that all values for (L), (F), (R), (N) and (n) must be expressed in the same units of measurement.

Considering now the specific implications which are established, by the principles set forth in Formulae I and II with reference to the optical components of panoramic cameras, constructed in accordance with the present invention, it will be obvious that the objectives employed should be telephoto-lenses with variable, adjustable focal lengths.

Such adjustability of the equivalent focal lengths (F) allows for control of the factor (F) in Formula II. This is particularly necessary, when for example the numerical value for the radius of the film-transport-sprocket 17 (R) and the value for the pitch of the film (20 p—p) are such that no rational fraction for the two values can be set up.

Namely to apply the formulae set forth hereinabove, particularly Formula II one must, of necessity have a rational fraction.

The mechanical components of the arrangement will operate and function at a nominal focal length, and they do not require adjustment, exchange, or other manipulation during use of the camera.

In order to obtain sharp, well-defined pictures with a panoramic camera, it is necessary to keep the equivalent focal length, of the objective lens used, accurately, within narrow limits. As commonly, telephoto-lenses are usually kept only to tolerances of plus or minus 5% one can only obtain the here required degree of accuracy if the equivalent focal length of the lenses used here, be adjustable within the narrowest limits of less than plus or minus 5%.

In the panoramic cameras of the conventional and well known constructions, heretofore generally in use, the use of lenses with long focal lengths as objectives for instance 40", 80" and 150" constitute a great problem. Insurmountable difficulties arose, particularly, when it was desired to take pictures continuously or to obtain a consecutive series of panoramic pictures.

For example, when it was necessary to take long focal lengths panoramic pictures with the conventional equipment already hereinabove referred to, and conventional panoramic cameras had to be designed to meet the specific and particular requirements of long focal lengths, extremely long and extended camera-housings were always required. This need is due to the conventional arrangement and construction in which the film transport sprocket is stationary within the camera-housing and the camera-housing must rotate. The axis of this rotation is established, in this arrangement always by a line, vertically extended through the rear nodal point of the lens used as objective in the instant case.

In the conventional arrangement having a fixed film-transport-sprocket, the diameter of the sprocket must always be equal to twice the length of the focal length of the objective employed. The lack of feasibility of such an arrangement when long focal length lenses are employed is obvious. A 40" lens would require an 80" $\phi$ sprocket.

By means of the arrangement set forth herein, it is however possible to combine the features of panoramic cameras with the advantages of long focal length lenses in an advantageous and successful manner.

In all the drawings, several variations of types of constructions, conceivable under the general concept of the present invention are shown in detail. Particular mention should be made of the variations illustrated in Fig. 5, Fig. 6 and Fig. 9.

Figure 5:
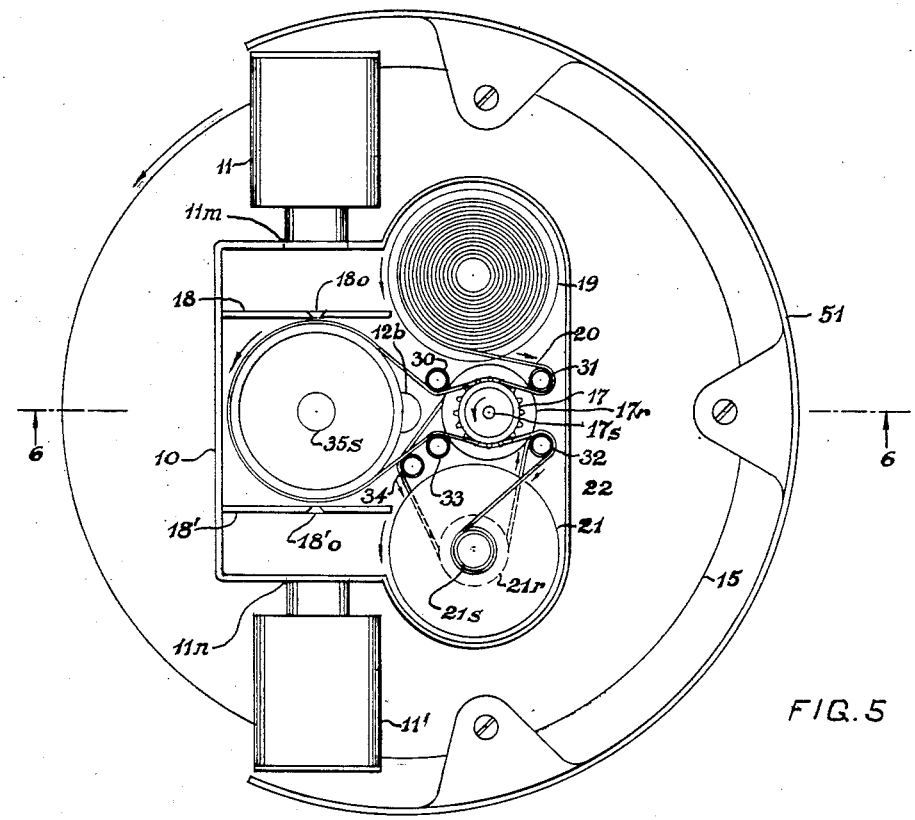
Fig. 5 is a view like in Figs. 1 and 3 illustrating a further and other preferred embodiment of the present invention.
Figure 6:
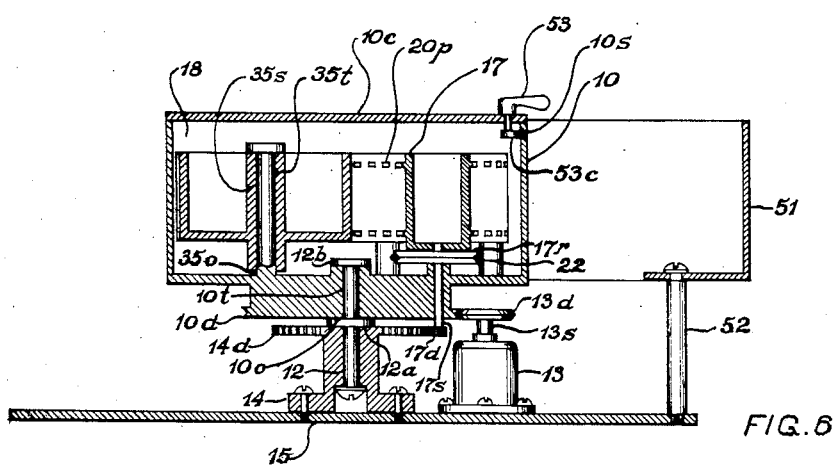
Fig. 6 is a view in cross-section and side-elevation showing the details of construction in the manner shown in Figs. 2 and 4, for the panoramic camera illustrated in Fig. 5.
Figure 7:
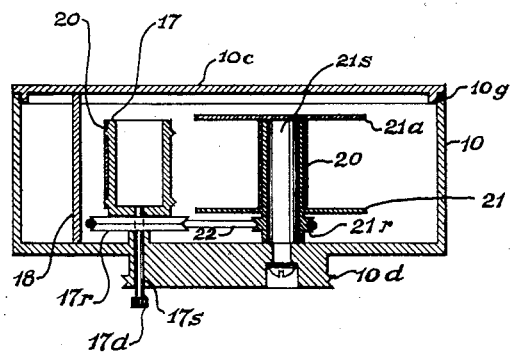
Fig. 7 is a view in side-elevation and cross-section along the line 7—7 of Fig. 1.
Figure 8:
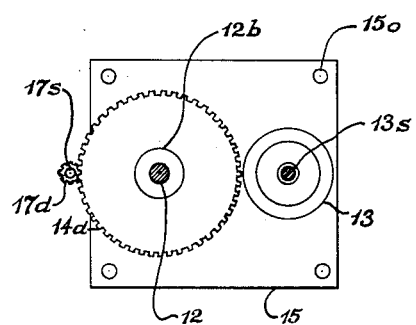
Fig. 8 is a top-plan view along the line 8—8 of Fig. 2.

In Fig. 5 and Fig. 6 an arrangement is shown, in which two objectives lens 11 and lens 11' are used. A shield 51 is provided which screens off a sector of the 360° sweep of the camera. The use of the two lenses 11 and 11' provides however for the almost continuous scanning of the sweep-sector-area which is not screened off; this because when one lens has traversed the exposed sector entering the screened sector, the second lens simultaneously having traversed the screened off sector will enter into the exposed sweep sector.

Figure 9:
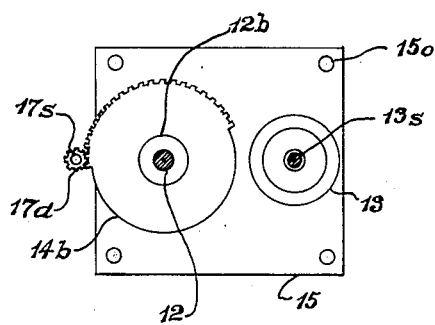
Fig. 9 is a view identical to the view shown in Fig. 8 illustrating however a modification in construction and representing therefore a further embodiment of the present invention.

In Fig. 9, an alternative arrangement is shown for the type of device particularly shown in Fig. 5 and Fig. 6. The need for the shield 51 is eliminated and also the exposure of film in a sweep area not under observation is avoided as the film is only moved during the sweep through the observed sector. Of course in this case as illustrated in Fig. 9 particularly the use of only one objective is foreseen. The intermittent film-transport is provided by having the gear-plate 14b provided with a partial complement of teeth so spaced and positioned as to only engage the drive-gear 17d of the film transport 17 when the lens 11 traverses an area-sector predetermined for observation and thus film exposure.

Figure 3:
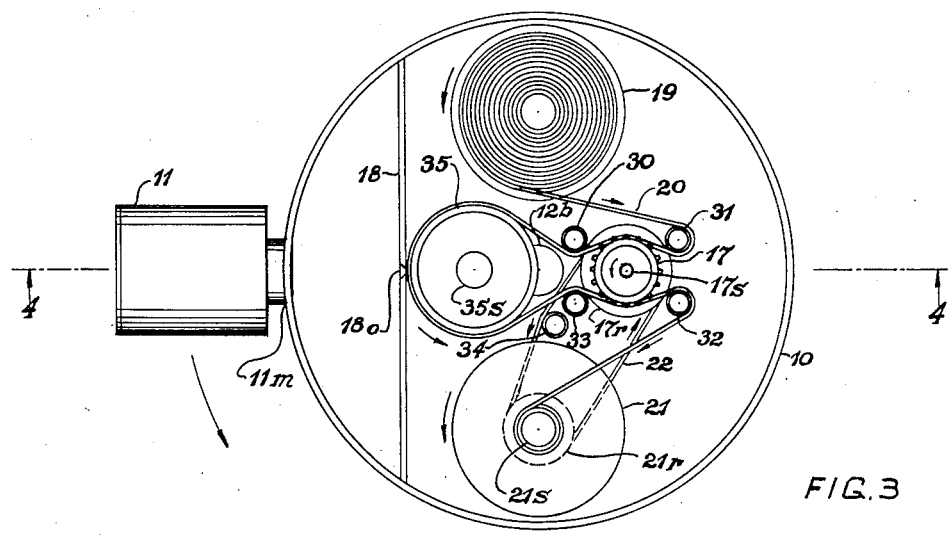
Fig. 3 is a view like shown in Fig. 1; however illustrating another preferred form embodying the present invention.
Figure 4:
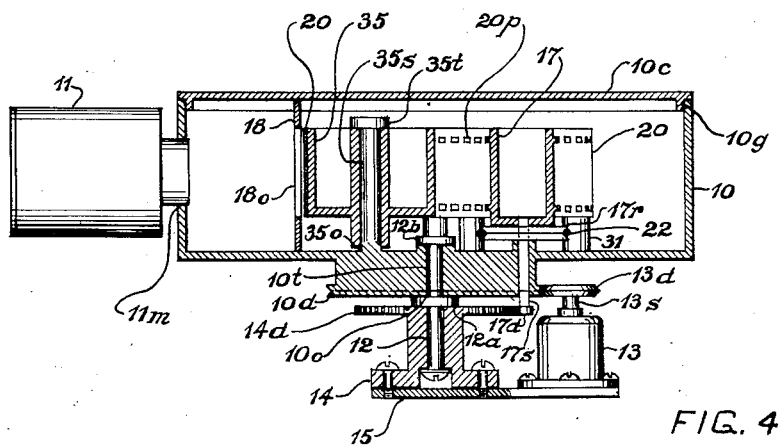
Fig. 4 is a view like shown in Fig. 2 illustrating in cross-section the arrangement of component members in the preferred embodiment of this invention illustrated in Fig. 3.

In Fig. 3 and Fig. 4 a further alternative is illustrated in which the film is exposed while being moved over the free wheeling film-tension-drum 35.

Visualizing the film transport as illustrated and shown particularly in Figs. 3, 4, 5 and 6; it will be seen that the film 20 passes from the film supply spool 19 via roller 31 actuated by the teeth of the sprocket 17 to roller 30; thence upon the film tension drum 35 to exposure; thence to roller 32 onto the film winding up spool 21.

In the instant arrangement the film-winding up spool 21 is rotated by actuation from the driving belt 22 which interengages the respective shafts, of the film-transport 17s and the spool 21s, being held in proper position by the belt deflection roller 34.

Having set forth, described and illustrated here exemplifications revealing the gist of our invention and a sample variety of mechanical arrangements embodying the same, what we claim as new and desire to secure by Letters Patent is:

1. In a panoramic camera, a base, a camera housing rotatably mounted on said base, a source of power adapted to rotate the housing with respect to said base, a film supply spool within the housing, a stationary sprocket member adapted to draw film from the supply spool, a wind-up spool within the housing to receive film from the sprocket, opposed lenses carried by the housing on opposite sides thereof, slit means between each lens and the film and a shield carried by the base to screen off a sector of the camera sweep whereby light may enter the camera through only one of said lenses at a time.

2. In a panoramic camera, a base, a camera housing rotatably mounted on said base, a source of power adapted to rotate the housing with respect to said base, a film supply spool within the housing, a stationary sprocket member adapted to draw film from the supply spool, a film tensioning drum spaced from the sprocket to support a length of film, a wind-up spool within the housing to receive film from the sprocket, opposed lenses carried by the housing on opposite sides thereof, slit means between each lens and the film upon the drum and a shield carried by the base to screen off a sector of the camera sweep whereby light may enter the camera through only one of said lenses at a time.

3. In a panoramic camera, a base, a camera housing rotatably mounted on said base, a source of power adapted to rotate the housing with respect to said base, a film supply spool within the housing, a stationary sprocket member adapted to draw film from the supply spool, a film tensioning drum spaced from the sprocket to support a length of film, a wind-up spool within the housing connected to the source of power to receive film from the sprocket, opposed lenses carried by the housing on opposite sides thereof, slit means between each lens and the film and a shield carried by the base to screen off a sector of the camera sweep whereby light may enter the camera through only one of said lenses at a time.

References Cited in the file of this patent
UNITED STATES PATENTS

| | | |
|---|---|---|
| 621,545 | Stark | Mar. 21, 1899 |
| 1,071,346 | Reeves | Aug. 26, 1913 |
| 2,349,931 | Back | May 30, 1944 |